Feb. 1, 1955 H. E. BARBER 2,700,860
MOWER ASSEMBLY FOR TRACTORS
Filed Aug. 21, 1951 2 Sheets-Sheet 1

INVENTOR.
HIRAM E. BARBER
BY Arthur H. Sturges
Attorney

Feb. 1, 1955  H. E. BARBER  2,700,860
MOWER ASSEMBLY FOR TRACTORS
Filed Aug. 21, 1951  2 Sheets-Sheet 2

INVENTOR.
HIRAM E BARBER
BY Arthur H. Sturges
Attorney ered from the support beam 12 by a nut 128. The elongated shoe 22 is adjusted vertically to regulate the

United States Patent Office 2,700,860
Patented Feb. 1, 1955

2,700,860

MOWER ASSEMBLY FOR TRACTORS

Hiram E. Barber, Crete, Nebr., assignor to M. A. Benne, Crete, Nebr.

Application August 21, 1951, Serial No. 242,882

1 Claim. (Cl. 56—25)

This invention relates to farm implements and particular mowing machines, and in particular in improved method of attaching the cutter or sickle bar of a mowing machine to a tractor so that the cutter bar is actuated by the power take-off of the tractor and whereby the diameter of the eccentric to which the pitman for connecting the cutter bar to the eccentric is connected is comparatively large so that the stroke is increased.

The purpose of this invention is to provide a comparatively simple attachment for mounting the sickle bar of a mowing machine on a tractor whereby the cutter bar of the sickle bar may be actuated by the power take-off of the tractor and whereby the sickle bar may be moved upwardly about a pivotal connection for transportation.

Various attempts have been made to operate mowing machines with tractors, however, when links and the like are used as the connecting means the mower elements are spaced from the tractors and for this reason it is difficult to turn corners and make a close and even cut. With this thought in mind this invention contemplates a mower attachment having a transversely disposed mounting beam upon which the mower elements are carried, a transversely positioned support beam to which the mounting beam is pivotally connected, shoes for spacing the sickle bar from the ground, means actuating the cutter bar of the sickle bar from the power take-off of the tractor, spaced parallel bars for attaching the support bar to a tractor, and means connecting the attachment to power lift levers of the tractor.

The object of this invention is, therefore, to provide means for mounting the sickle bar of a mower on a tractor whereby the cutter bar of the mower may be actuated by the power take-off of the tractor and so that the sickle bar may be elevated by the power lift mechanism of the tractor.

Another object of the invention is to provide means for mounting the elements of a mowing machine on a tractor whereby the cutter bar of the mowing machine operates with a longer stroke so that the blades cover the spaces between two guards instead of one as in conventional mowers.

A further object of the invention is to provide an attachment for mounting mower elements on a tractor wherein a direct drive is provided from the power take-off of the tractor to the cutter bar of the mower.

A still further object of the invention is to provide an extended shoe or skid for a mower attachment for a tractor whereby the vertical movement of the sickle bar caused by uneven terrain is reduced to a minimum.

An a still further object is to provide a mower attachment for a tractor whereby the mower is efficiently operated which is of a simple and economical construction.

With these and other objects and advantages in view the invention embodies upper and lower parallel bars pivotally mounted on the rear axle housing of a tractor, a support beam pivotally attached to the ends of the lower bars and having extensions to which an upper bar is pivotally attached, a mounting beam pivotally mounted on a rod extended from the support beam, a sickle bar pivotally mounted on one end of the mounting beam, shoes for supporting the attachment in spaced relation to the ground, and elevating and operating instrumentalities connecting the parts to power elements of the tractor.

Other features and advantages of the invention will appear from the following description taken in connection with the drawings, wherein.

Figure 1:
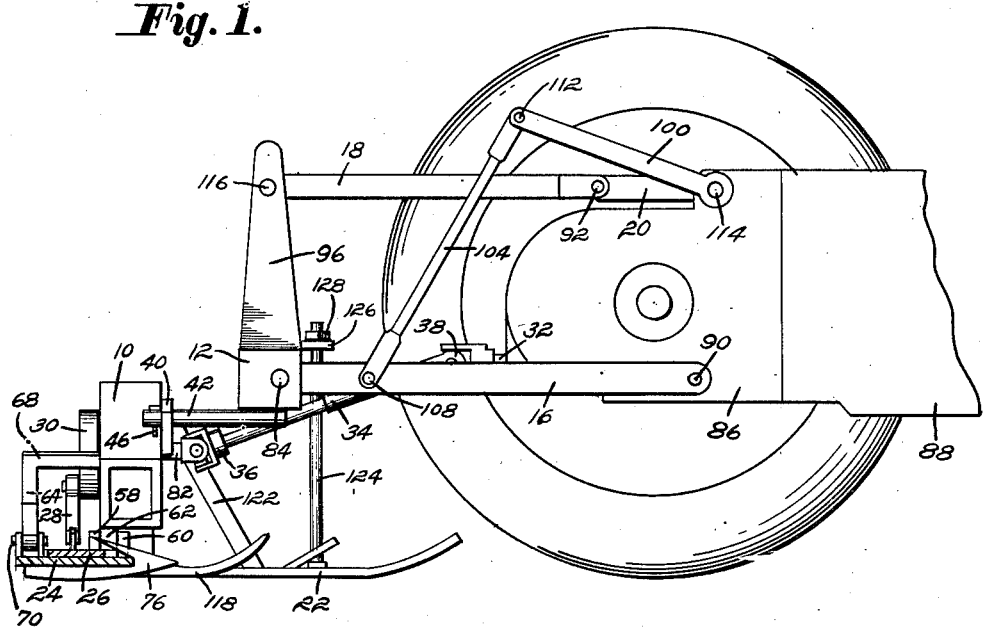
Figure 1 is a side elevational view with parts broken away and shown in section illustrating the mower attachment on the rear part of a tractor with part of the tractor broken away and with the sickle bar shown in section.
Figure 2:
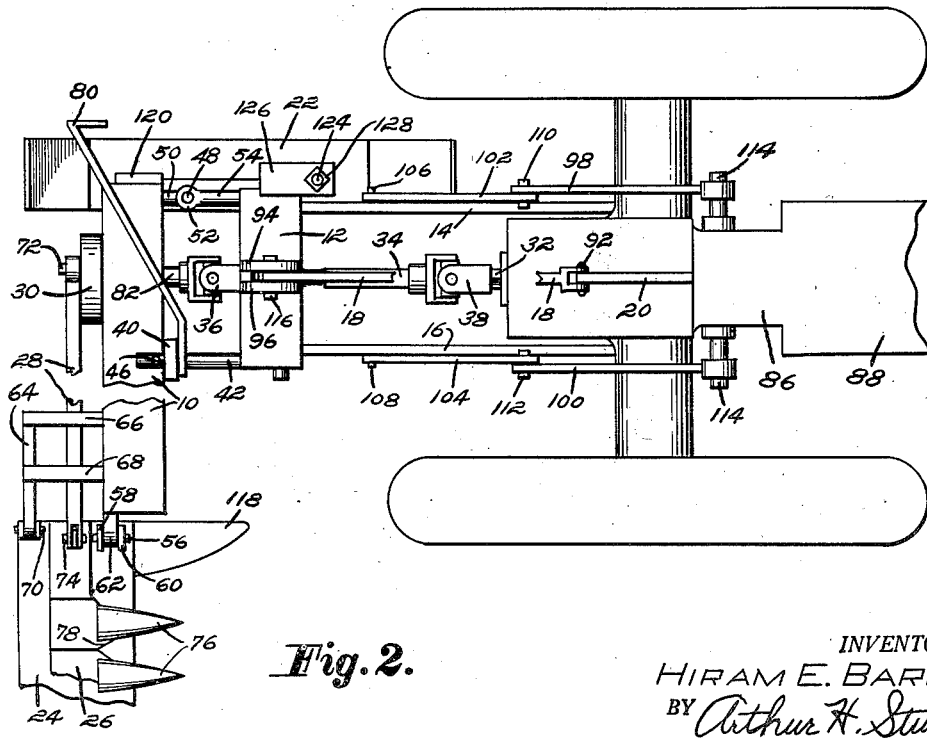
Figure 2 is a plan view of the mower attachment also with parts broken away.

Referring now to the drawings wherein like reference characters denote corresponding parts the tractor mower attachment of this invention includes a transversely disposed mounting beam 10, rectangular-shaped in cross section, a horizontally disposed transversely positioned support beam 12, carried by parallel bars 14 and 16 and held upright by a bar or brace 18 pivotally connected to an extension 20, an elongated shoe 22, a sickle bar 24 having a cutter bar 26 thereon, and a pitman 28 connected to an eccentric 30 which is driven from the power take-off shaft 32 through a shaft 34 having universal joints 36 and 38 therein.

The mounting beam 10 is pivotally mounted by a tab 40 on the forward side thereof on a rod 42 which extends from the support beam 12 and the tab is held by a shear pin 46 whereby should the sickle bar engage a rock, stump, or other fixed object the pin will shear and the sickle bar will swing rearwardly about a pivot pin 48 in a stud 50 on the mounting beam and which also extends through an eye 52 on the end of a rod 54 extended from the support beam.

Figure 3:
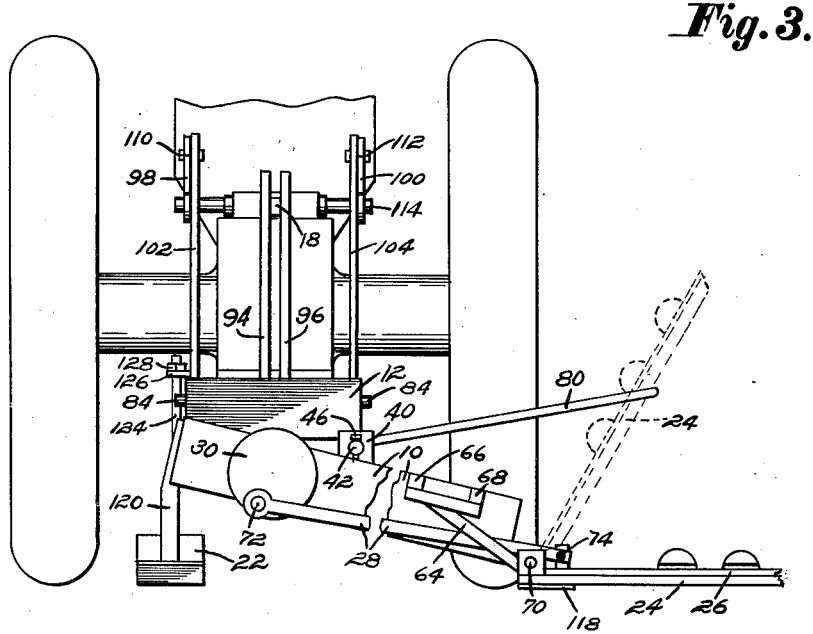
Figure 3 is a rear elevational view of the attachment and tractor and also with parts broken away.

The mounting beam 10 is supported in an inclined position, as shown in Figure 3, and the sickle bar 24 is pivotally attached to a lug on the lower end thereof by a pin 56 which extends through ears 58 and 60 on the sickle bar and through the lug which is indicated by the numeral 62. The rear edge of the sickle bar is also pivotally supported by a brace 64 carried by bars 66 and 68 extended from the beam 10, and the brace is pivotally connected to the sickle bar with a pin 70. The cutter bar 26 which is slidably mounted on the sickle bar is reciprocated by the eccentric 30 through the pitman 28, the pitman being connected to the disc of the eccentric with a pin 72 and to the cutter bar with a pin 74. The sickle bar is provided with conventional guards 76 and the cutter bar with blades 78, which with the eccentric, as shown in Figure 3, travels a greater distance than the conventional cutter bar covering two spaces between the guards instead of one.

The rod 42 is also provided with a brace 80 which extends outwardly, as shown in Figure 3, to support the sickle bar in an upwardly extended position as indicated by the dotted lines, for transportation and the like.

The eccentric 30 is carried by a shaft 82 which is journaled in the mounting beam 10 and on the inner end of which the universal joint 36 is positioned. The universal joint 36 is mounted on the lower end of the telescoping shaft 34, the parts of which are keyed whereby should the shear pin 46 break or shear the parts of the shaft 34 will separate as the sickle bar swings to a position at the rear of the tractor.

The support beam 12 is provided with a shaft 84 and the rear ends of the parallel bars 14 and 16 are mounted on the shaft. The forward ends of the bars are attached to the rear axle housing 86 of a tractor 88 by bolts 90, and the upper bar 18 which is attached to an extension 20 by a bolt 92, is pivotally attached, at the opposite end, to fingers 94 and 96 that extend upwardly from the support beam. The bars 14 and 16 are connected to the power lift arms 98 and 100 of the tractor with links 102 and 104, the links being connected to the bars with studs 106 and 108 and to the power lift arms with bolts 110 and 112. The power lift arms are mounted on a shaft 114, and the upper bar 18 is attached to the fingers of the support beam by a pin 116.

The sickle bar 24 is provided with a conventional shoe 118, and the attachment is provided with an additional shoe 22 which is carried by a leg 120 that extends downwardly from the mounting beam 10. The shoe is also provided with a spacing strut 122 which extends from the beam to the shoe, and an adjusting rod 124, that is provided with a threaded upper end that is held in a tab 126 extended from the support beam 12 by a nut 128. The elongated shoe 22 is adjusted vertically to regulate the elongated, the shoe travels over uneven terrain with a smooth guiding action whereby a comparatively close cut of grass, grain, and the like is possible.

With the attachment mounted in this manner the sickle bar and mounting parts are readily elevated by the power lift of the tractor, and with the cutter bar directly connected to the power take-off numerous conventional parts are eliminated and a longer and more powerful stroke is possible. With the elongated shoe of the attachment the continuous up and down movement of the sickle bar is reduced to a minimum so that the travel of the sickle bar is comparatively even.

From the foregoing description it is thought to be obvious that a tractor mower attachment constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

In a mower attachment, the combination which comprises a horizontally disposed transversely positioned support beam, rectangular-shaped in cross section with spaced parallel fingers extended upwardly from the intermediate portion thereof and with a longitudinally disposed rod extended rearwardly from one end, parallel bars extended forwardly from said support beam and adapted to be pivotally attached to a tractor, said parallel bars being adapted to be connected to and operated by power lift arms of said tractor, a brace pivotally connected to said fingers and adapted to be connected to an extension bar on said tractor, a transversely disposed mounting beam, also rectangular-shaped in cross section, positioned in a vertical plane spaced rearwardly from and parallel to a vertical plane extended through said support beam, a tab extended upwardly from the intermediate portion of said mounting beam and positioned on the forward side thereof, said rod extended rearwardly from the support beam being extended through said tab and providing pivotal supporting means for the mounting beam, a longitudinally positioned shaft rotatably mounted in the mounting beam and having a disc with a pin eccentrically positioned thereon on the end on the trailing side of the beam and a universal joint on the end on the forward side of the beam, means for connecting the universal joint of the shaft to the power take-off of the tractor, a sickle bar hinged to and extended from one end of said mounting beam, a pitman rotatably mounted on the pin eccentrically positioned on the disc on the end of the shaft and operatively connected to the cutter bar of said sickle bar, a transversely disposed brace carried by and rigidly secured to the rear surface of the mounting beam, means for pivotally connecting the extended end of said brace to the sickle bar, an elongated longitudinally disposed shoe having an arcuate upwardly extended forward end positioned below the ends of the support and mounting beams on the side of the attachment opposite to that from which the sickle bar extends, means connecting the trailing end of the shoe to the mounting beam, and means adjustably connecting the leading end of the shoe to the support beam.

References Cited in the file of this patent

UNITED STATES PATENTS

| | | |
|---|---|---|
| 1,947,552 | Huddle | Feb. 20, 1934 |
| 2,248,332 | Budelier et al. | July 8, 1941 |
| 2,291,987 | Roger | Aug. 4, 1942 |
| 2,335,510 | Hansen | Nov. 30, 1943 |
| 2,502,805 | Spurlin | Apr. 4, 1950 |
| 2,550,412 | Girardi | Apr. 24, 1951 |